Patented Aug. 27, 1940

2,212,525

UNITED STATES PATENT OFFICE 2,212,525

COATING PROCESS AND PRODUCT

Frederick V. Lofgren, Valparaiso, Ind., assignor to Glenn Davidson, Aurora, Ill.

No Drawing. Application March 19, 1937,
Serial No. 131,863

9 Claims. (Cl. 91—68)

It has for sometime been customary to coat paper with finishing material including casein, animal glue, and in some cases starch, and for the finest grade of products with inclusion of clay or similar white pigment. In efforts at similar treatment of paper with use of alkalin oil seed flour in dispersions however, there has been such a serious tendency for the coated product, on drying, to become brownish and "muddy" in appearance, so that white products have not been successfully attained. I have found that this tendency to discoloration is associated with an inherent chemical action in the alkalin oil seed material, and in results at least, it is somewhat similar to the browning of the surface of an apple which has been cut and left exposed to the air. There is however no known close similarity in the mechanism. I have found further that the material can be treated, at some suitable stage before it receives its finish-drying, to stabilize it against such inherent tendency toward going off color, and while the chemical features are yet obscure, there is some reason for believing that the reactive substance occasioning the trouble is rendered ineffective by a controlled change in its character. In accordance with the invention then, surfaces may be coated by employment of alkalin oil seed proteinous material, such as to maintain an outstanding whiteness and clearness of finish, whether in high grade coated paper or in less expensively finished products.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

In a typical case, the surface operated upon may be a high grade paper as for the production of coated printing and lithograph papers, although the benefits of the invention may be had also with other surfaces, whether low grade papers or other sheet cellulose, including textile fabrics as well as the felted fabrics. The oil seed material may be from soya bean, castor bean, cotton seed, lupines, etc., and it is desirable that the oil shall have been more or less completely removed, leaving the seed residue which is suitably ground to flour, and such flour, either with or without heat treatment as may be desired in some cases, is made up into a spreadable dispersion with an alkalin medium. While alkalin salts such as sodium carbonate, sodium borate, trisodium phosphate and the like may be employed in some instances, particularly where the non-proteinous substances are high, generally a stronger alkali such as a caustic alkali, particularly sodium hydroxide, is desirable. Where starting with an oil seed flour, for instance soya bean flour, this may be stirred up into a smooth mixture with two to five times its amount of water, by weight, a strong caustic alkali in solution will then be stirred in, as for instance two to ten per cent NaOH on the basis of the dry weight of the flour. Then, it is desirable to subject the material to the action of a stabilizing agent, for instance hydrogen peroxide. This may be employed in amounts of one-tenth to equal the amount of the original dry flour, where using a customary 3 per cent $H_2O_2$ solution. For the action of the stabilizer, the material is allowed to stand for one-half to one or two hours or up to twelve for instance, the time depending somewhat upon the temperature. If the temperature be raised to 120–180° F., the shorter time is sufficient, but if the material be maintained at ordinary room temperature, somewhat longer time is required. Other agents which may be employed as stabilizers or discoloration-preventers in some cases are benzoyl peroxide, sodium peroxide, sodium perborate, calcium hypochlorite, etc., being taken that any agent along this line be of a character which will not of itself form colored products, and for conciseness such agents may be designated "discoloration-preventing agents" or "stain-preventing agents." Such an agent as pine oil, "butyl carbitol," or other antifoam agent as sold under various trade names can be added in amount of two to fifteen per cent, and then the paper coating clay is incorporated, preferably already in suspension in water as a slip. Generally about one hundred pounds of dry clay to six to thirty-five pounds of the dry oil seed flour is used. Amounts of sodium peroxide and the like suitable may be 0.1 per cent to ten per cent of the amount of the initial oil seed flour, depending somewhat upon the source and precise character of the oil seed but mostly upon the character of finished product desired. In some instances, the addition of an antimony salt, such as potassium antimony tartrate, is advantageous, being found to act on a catalytic order, making it possible to somewhat reduce the amount of the hydrogen peroxide or stabilizer. Such catalyst must of itself be such as not to yield coloring products, although such salts as nickel sulphate are unobjectionable, since any very slight green coloration therefrom is not noticeably effective on the desired white product. The oil seed proteinous preparation with or without the clay or the like is applied to the sheet cellulose suitably, as by brushing applicators, rolls, and in some cases dipping, the material being spread uniformly over the cellulose surface, and then the products are dried, at room temperature, or usually at a slightly elevated drying temperature.

The stabilizing agent as added to the proteinous material even though it should not show a perceptible direct lightening has the ultimate peculiar action of maintaining the product against subsequent discoloration on heating or drying.

As an example: A high grade paper stock suitable for coating, is surfaced by employment of 50 parts by weight of soya bean flour made up into a dispersion with three times its amount of water, 15 parts of a 20 per cent NaOH solution being mixed into uniformity, and then 25 parts of 3 per cent hydrogen peroxide solution. After heating to about 150° F. for about 30 minutes, 7 parts of pine oil is added, and then paper coating clay slip is added in amount to give a mixture wherein there are 20 parts of dry soya bean flour to 100 parts of dry clay. The paper in web form is passed through an applicator machine spreading the mixture uniformly, and the product is then dried and usually calendered.

With inclusion of a stabilizing agent, furthermore it becomes possible to heat the alkaline oil seed flour mixture considerably, to temperatures as above noted or somewhat higher, and I find that thereby the adhesiveness of the material is very much enhanced, and yet without spoiling the color. Such heating without the stabilizer treatment would result in the material going off to a very dark brown color.

With changes in the character of the mineral filling material, instead of the paper coating clay, different effects may of course be had, and with omission of all such mineral material, again coated products of varied cellulosic character may be produced. In all cases, the outstanding result is had that the coated product is maintained against discoloration, instead of ultimately undergoing darkening and color change as is customarily to be expected from oil seed material.

Other modes of applying the principle of the invention may be employed, change being made as regards the details described, provided the features stated in any of the following claims, or the equivalent of such, be employed.

I therefore particularly point out and distinctly claim as my invention:

1. In a process of surfacing sheet cellulose with an alkalin suspension of oil seed flour, inhibiting darkening of the oil seed surface material by subjecting the oil seed flour to the action of water and an alkalin agent and to the action of hydrogen peroxide, and applying the product to sheet cellulose.

2. In a process of surfacing sheet cellulose with an alkalin suspension of oil seed flour, inhibiting darkening of the oil seed surface material by subjecting the oil seed flour to the action of water and an alkalin agent and to the action of hydrogen peroxide and potassium antimony tartrate, and applying the product to sheet cellulose.

3. In a process of surfacing sheet cellulose with an alkalin suspension of oil seed flour, inhibiting darkening of the oil seed surface material by subjecting the oil seed flour to the action of water and an alkalin agent and to the action of hydrogen peroxide and a catalyst from the group consisting of potassium antimony tartrate and nickel sulphate, and applying the product to sheet cellulose.

4. In a process of surfacing sheet cellulose with an alkalin suspension of oil seed flour, inhibiting darkening of the oil seed surface material by subjecting the oil seed flour to the action of water and an alkalin agent and to the action of hydrogen peroxide, heating, and applying the product to sheet cellulose.

5. In a process of surfacing sheet cellulose with an alkalin suspension of oil seed flour, inhibiting darkening of the oil seed surface material by subjecting the oil seed flour to the action of water and an alkalin agent and to the action of hydrogen peroxide, heating, then incorporating mineral filler, and applying the product to sheet cellulose.

6. Paper having a surface of the reaction products of an alkalin agent and hydrogen peroxide and oil seed flour.

7. Paper having a surface of the reaction products of an alkalin agent and oil seed flour and hydrogen peroxide and potassium antimony tartrate.

8. Paper having a surface of the reaction products of an alkalin agent and oil seed flour and hydrogen peroxide and a catalyst from the group consisting of potassium antimony tartrate and nickel sulphate.

9. Paper having a surface of the reaction products of an alkalin agent and oil seed flour and a discoloration-inhibiting agent from the class consisting of hydrogen peroxide, benzoyl peroxide, sodium peroxide, sodium perborate and calcium hypochlorite, and a catalyst from the group consisting of potassium antimony tartrate and nickel sulphate.

FREDERICK V. LOFGREN.